No. 897,548. PATENTED SEPT. 1, 1908.
C. F. LINDSAY.
ARC LIGHT ELECTRODE AND METHOD OF MAKING THE SAME.
APPLICATION FILED DEC. 10, 1903.
WITNESSES:
INVENTOR:
Charles F. Lindsay,
By
Att'y.

UNITED STATES PATENT OFFICE.

CHARLES F. LINDSAY, OF SCHENECTADY, NEW YORK, ASSIGNOR TO GENERAL ELECTRIC COMPANY, A CORPORATION OF NEW YORK.

ARC-LIGHT ELECTRODE AND METHOD OF MAKING THE SAME.

No. 897,548.     Specification of Letters Patent.     Patented Sept. 1, 1908.

Application filed December 10, 1903. Serial No. 184,668.

*To all whom it may concern:*

Be it known that I, CHARLES F. LINDSAY, a subject of the King of Great Britain, residing at Schenectady, county of Schenectady, State of New York, have invented certain new and useful Improvements in Arc-Light Electrodes and Methods of Making the Same, of which the following is a specification.

I have discovered that excellent electrodes for use in arc lamps can be made from a mixture containing iron oxid and titanium oxid which is treated to convert a large amount of the iron oxid into metallic iron and to more or less reduce the titanium oxid.

In the accompanying drawing I have shown in elevation an electrode embodying my invention.

In forming such electrodes I have found the following method to give excellent results:—An intimate mixture containing substantially 70 parts of the magnetic oxid of iron, 30 parts of rutile and 1 part of potassium carbonate is first formed. This mixture is then treated to convert a large part of the iron into the metallic state and to reduce more or less of the titanium oxid. This reduction may be performed in various ways. One of the methods which I have employed for reducing the mixture is to moisten it with a fluid binder until it becomes plastic and then mold it into cakes or balls, or squirt it into pencils. The cakes, balls or pencils thus formed are placed in crucibles or saggers and surrounded with powdered coke. The crucibles or saggers are placed in kilns or furnaces and are then fired for some time at a temperature of about 1200° C. Owing to the temperature employed, and other conditions, the iron is more affected by the reducing action than is the titanium much of which is probably reduced to the suboxid though I think it probable that some of the titanium is reduced to the metallic state. Another method of reducing this mixture consists in adding to the mixture about 10% or 12% of coke. The mixture last formed is then heated, in a powdered condition, in saggers or crucibles and in a suitable kiln or furnace to a temperature of about 1200° C. It will be observed that the carbon is added in amounts sufficient to convert practically the entire amount of the iron to the metallic state and to more or less reduce a considerable percentage of the titanium. The more or less reduced material formed by either of these methods is then reground and again thoroughly mixed and rendered plastic by the addition of a suitable fluid binder which may consist of glycerin mixed with water.

From the plastic mass pencils are molded, squirted or pressed in any suitable manner. The pencils thus formed are first dried at a temperature at about 200° C. to remove practically all of the moisture after which they are packed in powdered coke in saggers or crucibles and again fired at a temperature of about 1200° C. for some time. After this last firing the electrodes are allowed to gradually cool. Preferably after cooling, the electrodes are polished or brushed in any suitable manner to remove particles of coke which may adhere thereto. In the electrodes thus formed the titanium and iron are probably not in a chemical combination but the titanium may perhaps be said to be held in suspension in the reduced iron. The electrodes are very homogeneous and possess considerable mechanical strength. The electrical conductivity of the electrodes is very good in any case owing to the reduced iron contained in them. These electrodes give a steady, flaming or luminous arc yielding a great amount of light of a very good color.

Owing to the method of preparation of the electrodes containing reduced iron, they are somewhat porous and the heat conductivity is, therefore, much less than would be expected from the amount of reduced metal contained therein.

The porosity of the electrodes may be decreased and their heat conductivity increased by prolonging the period during which they are heated to a temperature which will cause a flowing together of the particles composing the electrodes.

The proportions of iron and titanium in the electrodes can vary between quite wide limits. I obtain good results with electrodes made from mixtures in which the proportions vary from 7 parts of rutile and 93 parts of magnetite to about 50 parts of rutile and 50 parts of magnetite. I prefer, however, to employ the mixture hereinbefore described in detail.

It will be obvious to those skilled in the art that many changes may be made in the form in which my invention is carried out without departing from its spirit. In particular the reduction may be so carried out that more or less of the titanium will be reduced to the metallic state. This result may be obtained by increasing the temperature at which the reduction is carried out and by prolonging the period during which it continues.

The method which I employ, of first reducing a considerable portion of the mixture of rutile and magnetite and then forming electrodes from the reduced mixture, and afterward subjecting the electrodes to a reducing action, adds much to the homogeneity of the electrodes which would have a tendency to become distorted and uneven if the entire reduction were carried out in pencils which were themselves to be used as electrodes. The second reduction taking place after the formation of pencils compacts them and adds to their mechanical strength as well as increases the amount of reduced material contained in them.

What I claim as new and desire to secure by Letters Patent of the United States, is:

1. The method which consists in partially reducing a mixture containing iron oxid and titanium oxid, grinding and mixing the partially reduced product, forming electrodes therefrom, and thereafter subjecting said electrodes to a reducing action.

2. The method which consists in subjecting an electrode mixture to a chemical action to partially change it, forming electrodes out of the product, and thereafter continuing the chemical action to still further change the material.

3. The method of forming electrodes, which consists in mixing together different constituent materials, subjecting the mixture to a reducing action, forming electrodes of the resultant mixture, and then subjecting the electrodes to a reducing action.

4. The method of forming electrodes, which consists in producing a mixture of metallic oxids, subjecting the mixture to a reducing action, forming electrodes of the mixture, and subjecting the electrodes to a further reducing action.

5. The process of making arc light electrodes which consists in subjecting metal oxids to a reducing action, then forming electrode pencils of the reduced product and subjecting the pencils to a reducing process.

In witness whereof, I have hereunto set my hand this 9th day of December, 1903.

CHARLES F. LINDSAY.

Witnesses:
BENJAMIN B. HULL,
MARGARET E. WOOLLEY.